US009407116B2

(12) United States Patent
Kondou et al.

(10) Patent No.: US 9,407,116 B2
(45) Date of Patent: *Aug. 2, 2016

(54) MULTI-GAP ROTARY MACHINE WITH DUAL STATOR AND ONE ROTOR WITH DUAL PERMANENT MAGNETS AND SALIENT POLES WITH DIMENSIONS AND RATIOS FOR TORQUE MAXIMIZATION

(71) Applicant: DENSO CORPORATION, Kariya, Aichi-pref. (JP)

(72) Inventors: Keiji Kondou, Nagoya (JP); Shin Kusase, Obu (JP); Takeo Maekawa, Okazaki (JP)

(73) Assignee: DENSO CORPORATION, Kariya (JP)

( * ) Notice: Subject to any disclaimer, the term of this patent is extended or adjusted under 35 U.S.C. 154(b) by 318 days.

This patent is subject to a terminal disclaimer.

(21) Appl. No.: 14/100,065

(22) Filed: Dec. 9, 2013

(65) Prior Publication Data
US 2014/0159533 A1   Jun. 12, 2014

(30) Foreign Application Priority Data

Dec. 7, 2012   (JP) .................................. 2012-268471
Sep. 18, 2013  (JP) .................................. 2013-192607

(51) Int. Cl.
*H02K 1/27* (2006.01)
*H02K 3/12* (2006.01)
(Continued)

(52) U.S. Cl.
CPC .. *H02K 3/12* (2013.01); *H02K 1/27* (2013.01); *H02K 1/276* (2013.01); *H02K 16/04* (2013.01); *H02K 16/00* (2013.01); *H02K 21/12* (2013.01); *H02K 2213/03* (2013.01)

(58) Field of Classification Search
CPC ...................... H02K 2213/00–2213/09; H02K 16/00–16/04; H02K 1/276; H02K 1/27; H02K 1/2706; H02K 21/12

USPC ............... 310/166, 122, 156.01–156.84, 269, 310/266, 216.001–216.137
See application file for complete search history.

(56) References Cited

U.S. PATENT DOCUMENTS 5,773,910 A * 6/1998 Lange ..................... H02K 1/27
310/156.02
5,783,893 A * 7/1998 Dade ..................... H02K 16/00
310/114

(Continued)

FOREIGN PATENT DOCUMENTS

JP   2002-165394   6/2002
JP   2007-068357   3/2007

(Continued)

OTHER PUBLICATIONS

Chunhua Liu, Chau, Zhang, Novel Design of Double-Stator Single-Rotor Magnetic-Geared Machines from IEEE, Nov. 11, 2012.*

(Continued)

*Primary Examiner* — Michael Andrews
*Assistant Examiner* — Maged Almawri
(74) *Attorney, Agent, or Firm* — Nixon & Vanderhye PC

(57) ABSTRACT

A multi-gap type rotary electric machine is provided, where the machine is provided a shaft supported rotatably by a baring secured to a housing. An annular rotor is secured to the shaft and configured to rotate together with the shaft. Double stators are secured to the housing and configured to have gaps between the stators and the rotor. Relationships of:

$$3.5 < P13/P6 \quad (1)$$
and
$$P7/P6 > 0.5 \quad (2)$$

are met, where P6 denotes a circumferential width of each of outer salient poles, P7 denotes a circumferential width of each of inner salient poles, and P13 denotes a circumferential width of each of the outer magnets.

4 Claims, 13 Drawing Sheets

(51) Int. Cl.
*H02K 16/04* (2006.01)
*H02K 16/00* (2006.01)
*H02K 21/12* (2006.01)

(56) References Cited

U.S. PATENT DOCUMENTS

| | | | |
|---|---|---|---|
| 9,124,161 B2 * | 9/2015 | Kim | H02K 16/04 |
| 2002/0047432 A1 | 4/2002 | Miyashita et al. | |
| 2004/0017123 A1 | 1/2004 | Miyashita et al. | |
| 2004/0108781 A1 * | 6/2004 | Razzell | H02K 7/11 |
| | | | 310/112 |
| 2009/0096314 A1 * | 4/2009 | Atarashi | H02K 21/029 |
| | | | 310/209 |
| 2010/0213885 A1 * | 8/2010 | Ichiyama | H02K 1/276 |
| | | | 318/720 |
| 2010/0308680 A1 | 12/2010 | Yamada et al. | |
| 2011/0193439 A1 | 8/2011 | Yabe et al. | |
| 2011/0285238 A1 * | 11/2011 | Kusase | H02K 16/04 |
| | | | 310/156.48 |
| 2011/0316366 A1 * | 12/2011 | Abbasian | H02K 16/04 |
| | | | 310/46 |
| 2012/0200187 A1 * | 8/2012 | Sano | H02K 1/2766 |
| | | | 310/156.07 |
| 2013/0264895 A1 | 10/2013 | Kondou et al. | |
| 2013/0270955 A1 * | 10/2013 | Lillington | H02K 1/2773 |
| | | | 310/156.11 |

FOREIGN PATENT DOCUMENTS

| | | | |
|---|---|---|---|
| JP | 2007-261342 | 10/2007 | |
| JP | 2008-302789 | 12/2008 | |
| JP | 2010-098853 | 4/2010 | |
| JP | 2011-103759 | 5/2011 | |
| JP | 2013-219950 | 10/2013 | |
| KR | WO 2011162500 A2 * | 12/2011 | H02K 16/00 |
| WO | WO 2010-058609 | 5/2010 | |

OTHER PUBLICATIONS

Japanese Office Action (2 pages) dated Mar. 17, 2015, issued in corresponding Japanese Patent Application No. 2013-223066, and English translation (2 pages).

Office Action (2 pgs.) dated Sep. 8, 2015 issued in corresponding Japanese Application No. 2013-223066 with an at least partial English language translation (4 pgs.).

* cited by examiner

AXIAL DIRECTION
(LENGTH-WISE DIRECTION)

FIG.10

| TORQUE CHARACTERISTICS | SUPERIOR | | INFERIOR | TORQUE CHARACTERISTICS |
|---|---|---|---|---|
| | GROUP H1 | GROUP H2 | GROUP L1 | |
| P1: OUTER-STATOR-OUTER DIAMETER (mm) | | 266 | | — |
| P2: OUTER-STATOR INTER-SLOT DIAMETER (mm) | 249~257 | 247~259 | ~247 | |
| P3: OUTER-STATOR-TOOTH WIDTH (mm) (PER POLE) | 16.8~27.0 | 15.0~30.0 | ~15, 30~ | |
| P4: ROTOR OUTER DIAMETER (mm) | 225~235 | 222~238 | ~222 | |
| P5: OUTER-MAGNET THICKNESS (mm) | 3.0~5.5 | 3.0~6.0 | ~3.0 | |
| P6: OUTER-SALIENT-POLE WIDTH (mm) | 3.0~9.0 | 2.0~10.0 | 10.0~ | |
| P7: INNER-SALIENT-POLE WIDTH (mm) | 4.0~13.0 | 3.5~13.0 | ~3.5 | |
| P8: INNER-MAGNET THICKNESS (mm) | 2.5~5.5 | 1.5~5.5 | 5.5~ | |
| P9: ROTOR INNER DIAMETER (mm) | 183~193 | 181~193 | 193~ | |
| P10: INNER-STATOR INTER-SLOT DIAMETER (mm) | 154~169 | 153~169 | 169~ | |
| P11: INNER-STATOR-TOOTH WIDTH (mm) (PER POLE) | 8.4~19.5 | 7.4~19.5 | 19.5~ | |
| P12: INNER-STATOR INNER DIAMETER (mm) | 144~156 | 140~158 | 158~ | |
| P13: OUTER-MAGNET WIDTH (mm) (PER POLE) | 28~42 | 27~43 | ~27 | RELATIVE DIMENSIONAL RANGES |

FIG.11

MODEL 31

| P1: OUTER-STATOR OUTER DIAMETER (mm) | 266 |
|---|---|
| P2: OUTER-STATOR INTER-SLOT DIAMETER (mm) | 252 |
| P3: OUTER-STATOR-TOOTH WIDTH (mm) (PER POLE) | 25.8 |
| P4: ROTOR OUTER DIAMETER (mm) | 231.3 |
| P5: OUTER-MAGNET THICKNESS (mm) | 4.0 |
| P6: OUTER-SALIENT-POLE WIDTH (mm) | 6.0 |
| P7: INNER-SALIENT-POLE WIDTH (mm) | 8.0 |
| P8: INNER-MAGNET THICKNESS (mm) | 4.2 |
| P9: ROTOR INNER DIAMETER (mm) | 191.8 |
| P10: INNER-STATOR INTER-SLOT DIAMETER (mm) | 166.5 |
| P11: INNER-STATOR-TOOTH WIDTH (mm) (PER POLE) | 17.82 |
| P12: INNER-STATOR INNER DIAMETER (mm) | 154 |
| P13: OUTER-MAGNET WIDTH (mm) (PER POLE) | 38.6 |

FIG.12

MODEL 123

| | |
|---|---|
| P1: OUTER-STATOR OUTER DIAMETER (mm) | 266 |
| P2: OUTER-STATOR INTER-SLOT DIAMETER (mm) | 254 |
| P3: OUTER-STATOR-TOOTH WIDTH (mm) (PER POLE) | 24.66 |
| P4: ROTOR OUTER DIAMETER (mm) | 234.54 |
| P5: OUTER-MAGNET THICKNESS (mm) | 3.6 |
| P6: OUTER-SALIENT-POLE WIDTH (mm) | 4.0 |
| P7: INNER-SALIENT-POLE WIDTH (mm) | 12.0 |
| P8: INNER-MAGNET THICKNESS (mm) | 3.4 |
| P9: ROTOR INNER DIAMETER (mm) | 189.1 |
| P10: INNER-STATOR INTER-SLOT DIAMETER (mm) | 167.3 |
| P11: INNER-STATOR-TOOTH WIDTH (mm) (PER POLE) | 14.52 |
| P12: INNER-STATOR INNER DIAMETER (mm) | 154 |
| P13: OUTER-MAGNET WIDTH (mm) (PER POLE) | 41.4 |

AXIAL DIRECTION
(LENGTH-WISE DIRECTION)

MULTI-GAP ROTARY MACHINE WITH DUAL STATOR AND ONE ROTOR WITH DUAL PERMANENT MAGNETS AND SALIENT POLES WITH DIMENSIONS AND RATIOS FOR TORQUE MAXIMIZATION

CROSS-REFERENCE TO RELATED APPLICATION

This application is based on and claims the benefit of priorities from earlier Japanese Patent Application Nos. 2012-268471 and 2013-192607 filed Dec. 7, 2012 and Sep. 18, 2013, respectively, the descriptions of which are incorporated herein by reference.

BACKGROUND OF THE INVENTION

1. Technical Field

The present invention relates to a multi-gap type rotary electric machine which is applicable to various uses, such as industrial uses and vehicle uses and in particular is preferred to be used in a drive motor for hybrid vehicles.

2. Related Art

As small and high-power motors based on conventional art, IPM motors (interior permanent magnet motors) are well known. The IPM motors can use reluctance torque that is a core attractive force, in addition to magnet torque that is generated by magnets. The IPM motors include double-stator motors in which stators are arranged in radially inside and radially outside of the rotor.

For example, a patent document JP-A-2008-302789 discloses a double-stator motor. In this double-stator motor, permanent magnets are embedded in the rotor so as to be located radially inward thereof, being opposed to the inner stator, and also embedded in the rotor so as to be located radially outward thereof, being opposed to the outer stator. The rotor also has salient poles (rotor core portions) each of which is formed between circumferentially adjacent magnets.

However, the motor disclosed in the patent document JP-A-2008-302789 suffers from a problem of not being able to increase power density for the reasons set forth below.

a) The stator winding is a short-pitch winding. Therefore, the pole pitch of the rotor does not coincide with the pole pitch of the magnetic field generated by the stator windings. Therefore, the reluctance torque cannot be fully used.

b) The surface of each of the salient poles of the rotor is concaved. Specifically, the inner peripheral surface of each of the inner salient poles and the outer peripheral surface of each of the outer salient poles of the rotor are concaved. Therefore, magnetic resistance is increased and the reluctance torque cannot be fully used.

c) The outer magnetic circuit is ensured to have a high rate of the reluctance torque by increasing the outer-salient-pole width relative to one pole pitch of the rotor. However, this increases the length of the magnetic path and accordingly increases the magnetic resistance, resulting in decreasing the reluctance torque. Further, since the increase of the salient-pole width necessarily decrease the magnet width, the magnet torque cannot be fully used as well.

d) Further, due to the increase of the outer-salient-pole width of the rotor, the rotor yoke, in which the magnetic path is shared between the outer and inner magnetic circuits, is unavoidably saturated with the magnetic flux supplied from the outer salient poles to the rotor. As a result, torque is decreased in the inner magnetic circuit as well which is preferred to have a short magnetic path compared to the outer magnetic circuit and to increase the rate of the reluctance torque.

SUMMARY

Hence it is desired to provide a multi-gap type rotary electric machine which is able to increase the rate of the magnet torque in the outer magnetic circuit and enhance the output torque by providing a configuration in which the reluctance torque is fully used in the inner magnetic circuit.

An exemplary embodiment provides a multi-gap type rotary electric machine, comprising: a shaft supported rotatably by a bearing secured to a housing; an annular rotor secured to the shaft and configured to rotate together with the shaft; and a stator secured to the housing and configured to have a gap between the stator and the rotor.

The rotor comprises an annular rotor core made of soft magnetic material and configured to have a radial direction and a circumferential direction, a plurality of inner magnets, each composed of a permanent magnet, embedded in radially inner portions of the rotor core at equal pitches in the circumferential direction, and a plurality of outer magnets, each composed of a permanent magnet, embedded in radially outer portions of the rotor core at equal pitches in the circumferential direction.

The rotor core comprises a plurality of inner salient poles each formed between mutually adjacent two of the inner magnets in the circumferential direction, and a plurality of outer salient poles each formed between mutually adjacent two of the outer magnets in the circumferential direction, the inner and outer salient poles being made of soft magnetic material.

The stator comprises at least an inner stator located on a radially inner side of the rotor with a gap left between the inner stator and the rotor, and an outer stator located on a radially outer side of the rotor with a gap left between the outer stator and the rotor.

The inner stator comprises an inner stator core provided with a plurality of inner slots formed on an radially outer circumference of the inner stator at equal intervals in the circumference direction and a plurality of inner teeth formed on the radially outer circumference at equal intervals in the circumferential direction, the inner slots and the inner teeth being aligned alternately in the circumferential direction; and an inner stator winding full-pitch wound at the inner stator core through the inner slots.

The outer stator comprises an outer stator core provided with a plurality of outer slots formed on an radially inner circumference of the outer stator at equal intervals in the circumference direction and a plurality of outer teeth formed on the radially inner circumference at equal intervals in the circumferential direction, the outer slots and the outer teeth being aligned alternately in the circumferential direction; and an outer stator winding full-pitch wound at the outer stator core through the outer slots.

In the foregoing construction, relationships of:

$$3.5 < P13/P6 \quad (1)$$

and $$P7/P6 > 0.5 \quad (2)$$

are met, where P6 denotes a circumferential width of each of the outer salient poles, P7 denotes a circumferential width of each of the inner salient poles, and P13 denotes a circumferential width of each of the outer magnets.

In the multi-gap type rotary electric machine of the present exemplary embodiment, the inner magnets are embedded in the rotor core so as to be located radially inward thereof and the outer magnets are embedded in the rotor core so as to be located radially outward thereof to provide inner salient poles each of which is located between circumferentially adjacent inner magnets, and outer salient poles each of which is located between circumferentially adjacent outer magnets. Thus, both of the magnet torque and the reluctance torque are put to practical use. Also, the inner and outer stators are applied with full-pitch winding of the inner and outer stator windings, respectively. Specifically, the pole pitch of the rotor is equal to the pole pitch of the magnetic field generated by the inner and outer stator windings. Accordingly, the reluctance torque can be fully used.

Further, with the requirements of Formulas (1) and (2) being met, appropriate relationship can be established between P13 (outer-magnet width), P6 (outer-salient-pole width) and P7 (inner-salient-pole width). Accordingly, the rate of the magnet torque is increased in the outer magnetic circuit. In addition, the rotor yoke, in which the magnetic path is shared between the outer and inner magnetic circuits, is prevented from being magnetically saturated. Thus, the reluctance torque can be fully used in the inner magnetic circuit as well.

In this way, the multi-gap type rotary electric machine of the present embodiment can enhance the output torque, reduce the size and increase the power.

BRIEF DESCRIPTION OF THE DRAWINGS

In the accompanying drawings:

FIG. 10 is a table listing the ranges of dimensions at portions of the magnetic circuits of motors;

FIG. 11 is a table listing the design specification of the model 31 shown in FIG. 9;

FIG. 12 is a table listing the design specification of the model 123 shown in FIG. 9.

DETAILED DESCRIPTION OF THE PREFERRED EMBODIMENTS

With reference to the accompanying drawings, hereinafter are described several embodiments of the present invention.

(First Embodiment)

Referring, first, to FIGS. 1 to 5, hereinafter is described a first embodiment of the present invention.

In the first embodiment, the multi-gap type rotary electric machine of the present invention is applied to a drive motor 1 which is installed in a vehicle or the like.

Figure 1:
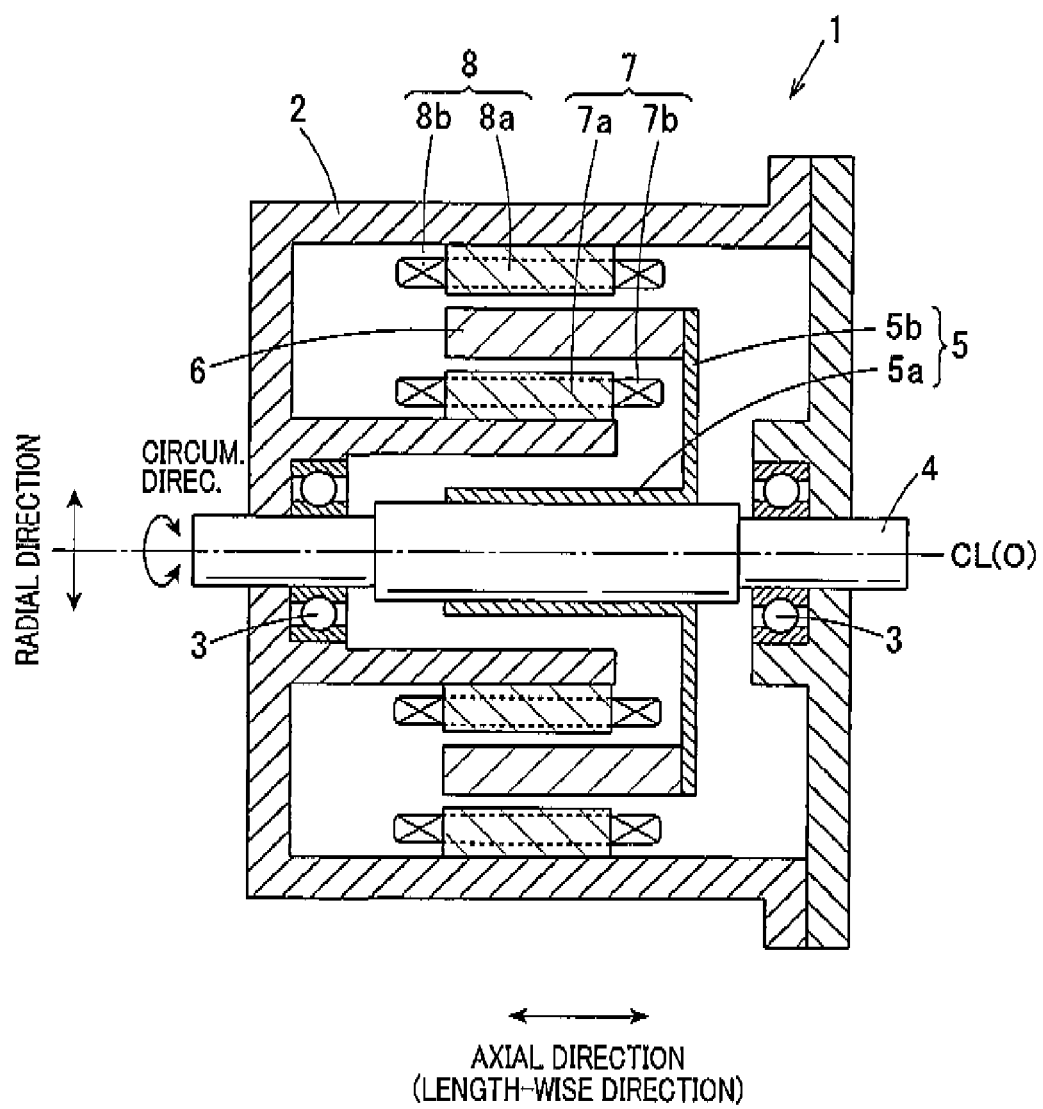
FIG. 1 is a vertical cross-sectional view illustrating a configuration of a motor, according to a first embodiment of the present invention.

FIG. 1 is a vertical cross-sectional view illustrating a configuration of the motor 1. As shown in FIG. 1, the motor 1 of the first embodiment includes a motor housing 2, a shaft 4, a rotor 6, an inner stator 7, and an outer stator 8. The shaft 4 is rotatably supported by the motor housing 2 via a bearing 3. The rotor 6 is in an annular shape and supported by the shaft 4 via a rotor retaining member 5. The inner stator 7 is arranged radially inside of the rotor 6. The outer stator 8 is arranged radially outside of the rotor 6.

The shaft 4 is configured to rotate on a length-wise central axis CL passing through a center O in a circular section of the shaft 4, which section is orthogonal to the length-wise section. Hence, the rotor 6, the inner stator 7, and the outer stator 8 are mutually coaxially arranged to the central axis CL.

For example, the rotor retaining member 5 is formed of a non-magnetic SUS material and includes a cylindrical portion 5a and a rotor disc 5b. The cylindrical portion 5a is fitted and fixed to the outer periphery of the shaft 4. The rotor disc 5b is in a disc-like shape and extended radially outward from an end of the cylindrical portion 5a. The rotor 6 is fixed to the rotor disc 5b.

Figure 2:
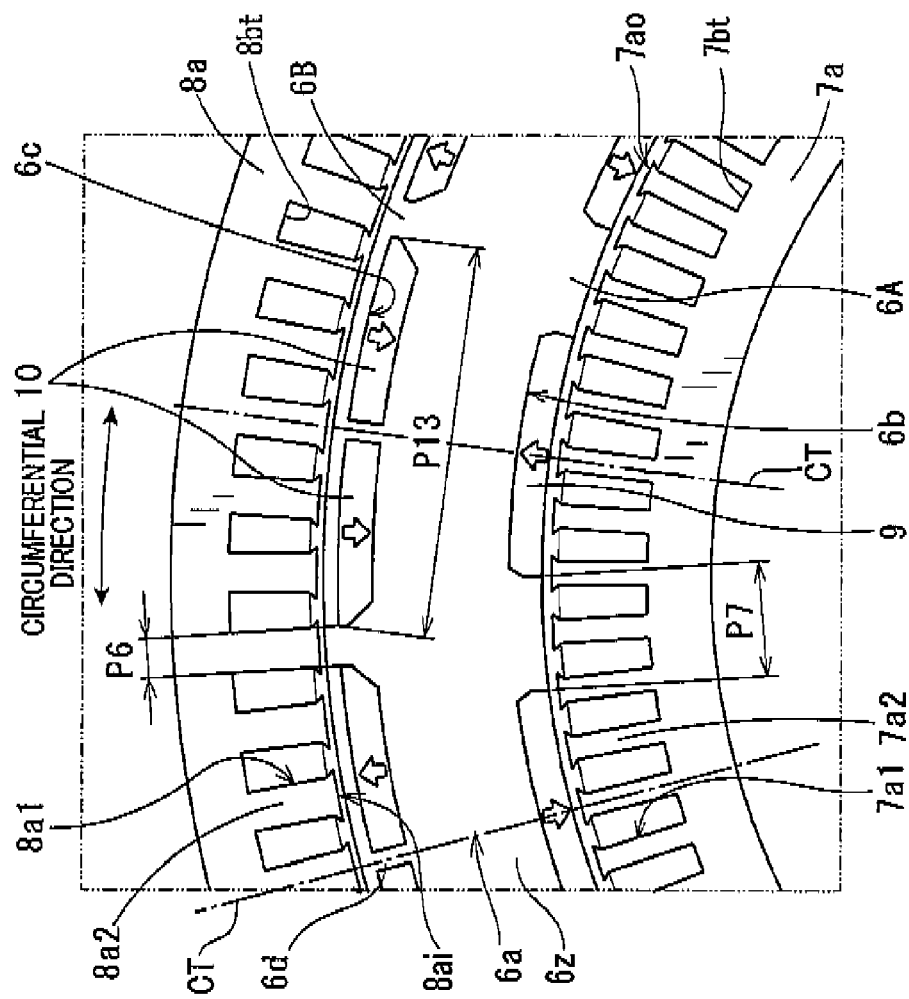
FIG. 2 is a cross-sectional view illustrating the magnetic circuits of the motor.

As shown in FIG. 2, the rotor 6 includes a rotor core 6a including a rotor yoke 6z, permanent magnets 9 (hereinafter referred to as inner magnets 9), and permanent magnets 10 (hereinafter referred to as outer magnets 10). The inner magnets 9 are embedded in the rotor core 6a so as to be located radially inward thereof and the outer magnets 10 are embedded in the rotor core 6a so as to be located radially outward thereof.

For example, the rotor core 6a is configured by stacking a plurality of core sheets each of which is formed by annularly pressing and punching an electromagnetic steel plate. The rotor core 6a has a radially inner peripheral portion which is provided with inner magnet insertion grooves 6b and inner salient poles 6A. The rotor core 6a also has a radially outer peripheral portion which is provided with outer magnet insertion holes 6c and outer salient poles 6B.

The inner magnet insertion grooves 6b and the outer magnet insertion holes 6c are each formed throughout the rotor core 6a in the direction of stacking the core sheets so as to have a predetermined opening width in the circumferential direction of the rotor core 6a. Also, the inner magnet insertion grooves 6b and the outer magnet insertion holes 6c are formed in the circumferential direction of the rotor core 6a at predetermined intervals, by the number equal to that of the poles of the rotor 6. Each of the inner magnet insertion grooves 6b is formed in a groove shape, with the inner peripheral side of the rotor core 6a being open. Each of the outer magnet insertion holes 6c is formed in a hole shape, with the outer peripheral side of the rotor core 6a being closed.

Each of the inner salient poles 6A is formed between circumferentially adjacent inner magnet insertion grooves 6b. Each of the outer salient poles 6B is formed between circumferentially adjacent outer magnet insertion holes 6c. The circumferential positions of the inner salient poles 6A in the rotor core 6a are ensured to coincide with those of the respective outer salient poles 6B. Each inner salient pole 6A has an inner peripheral surface which is ensured to be concyclic with the inner-radius surface of the rotor 6. Also, each outer salient pole 6B has an outer peripheral surface which is ensured to be concyclic with the outer-radius surface of the rotor 6.

The inner magnets 9 are inserted into the respective inner magnet insertion grooves 6b formed in the rotor core 6a, for arrangement at an even pitch in the circumferential direction.

The outer magnets 10 are inserted into the respective outer magnet insertion holes 6c formed in the rotor core 6a, for arrangement at an even pitch in the circumferential direction.

As shown by the hollow arrows in FIG. 2, the inner and outer magnets 9 and 10 are magnetized in the radial direction of the rotor 6. As can be seen, the direction of the polarity is different from each other between the circumferentially adjacent magnets. Also, the direction of the polarity is opposite to each other between the radially facing inner magnet 9 and outer magnet 10.

In the rotor 6a shown in FIG. 2, each outer magnet insertion hole 6c for inserting the outer magnet 10 has a circumferentially center portion at which the hole 6c is divided into two and a bridge 6d is formed to connect the inner peripheral side and the outer peripheral side of the outer magnet insertion hole 6c. The bridge 6d is provided for the purpose of preventing radially outward expansion of the radially outer portion of the rotor core 6a, which covers the outer peripheral surfaces of the outer magnets 10, when pressed radially outward due to the effect of the centrifugal force. Thus, the magnet insertion hole 6c, which is divided into two in FIG. 2, may be divided into three or more. However, the outer magnet insertion hole 6c does not have to be necessarily divided, unless the radially outer portion of the rotor core 6a comes into contact with the outer stator 8, or, in other words, as far as the deformation in the radially outer portion of the rotor core 6a is so small that the effect of the centrifugal force is ignorable.

In the rotor 6 shown in FIG. 2, the outer magnets 10 are inserted into and embedded in the respective outer magnet holes 6c to establish what is generally called a magnet-embedded structure. On the other hand, the inner magnets 9 are inserted into the respective inner magnet insertion grooves 6b with the radially inner peripheral surfaces of the magnets being exposed to establish a so-called inset structure. The expression "embedded" encompasses the term "inset". In other words, the multi-gap type rotary electric machine of the present disclosure is not limited to the magnet-embedded structure in which the permanent magnets are enclosed by the rotor core 6a, but may be applied to the inset structure in which the permanent magnets are embedded in the rotor core 6a with the magnets' surfaces (radially inner or outer peripheral surfaces) being exposed. In short, the "magnet-embedded structure" here is defined to encompass the "inset structure".

As shown in FIGS. 1 and 2, the inner stator 7 includes an inner stator core 7a with a radially outer circumference 7ao (see FIG. 2) and inner stator windings 7b of three phases (U, V and W) (see FIG. 1). On the radially outer circumference 7ao of the inner stator core 7a, a plurality of inner slots 7a1 are formed at regular intervals in the circumferential direction with an inner tooth 7a2 being formed in between the circumferentially adjacent inner slots 7a1. Each inner slot 7a1 has a bottom 7bt, as shown in FIG. 2. Full-pitch winding of the inner stator windings 7b is applied to the inner stator core 7a.

As shown in FIGS. 1 and 2, the outer stator 8 includes an outer stator core 8a with a radially inner circumference 8ai (see FIG. 2) and outer stator windings 8b of three phases (X, Y and Z) (see FIG. 1). On the radially outer circumference 8ai of the outer stator core 8a, a plurality of outer slots 8a1 are formed at regular intervals in the circumferential direction with an outer tooth 8a2 being formed in between the circumferentially adjacent outer slots 8a1. Each outer slot 8a1 has a bottom 8bt, as shown in FIG. 2. Full-pitch winding of the outer stator windings 8b is applied to the outer stator core 8a.

The number of slots is the same between the inner and outer stators 7 and 8.

Figure 3:
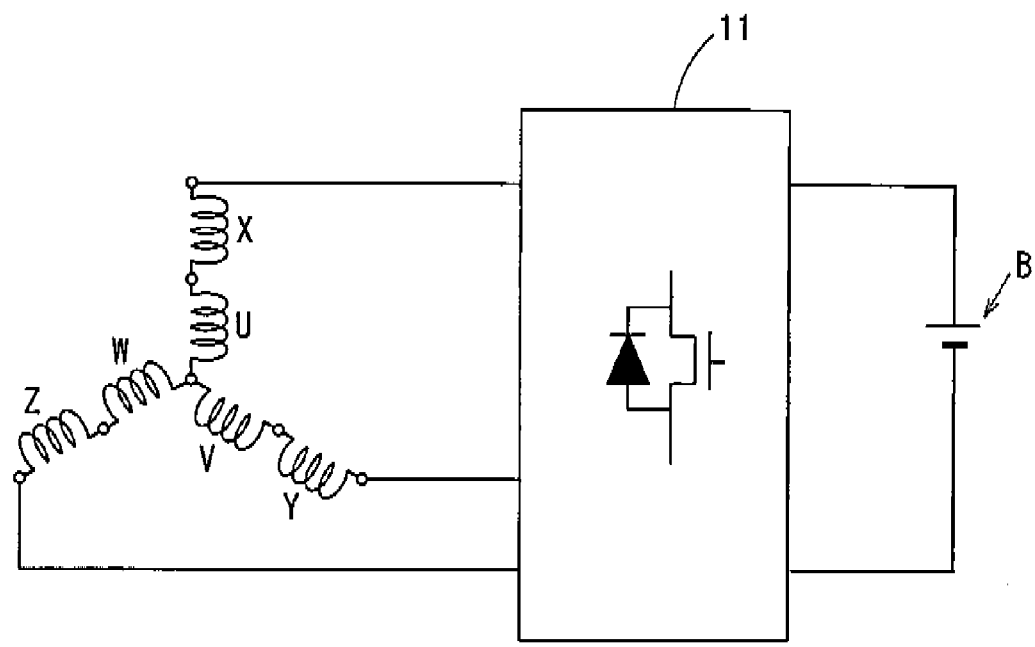
FIG. 3 is a connection diagram illustrating a state where inner and outer stator windings are connected to an inverter.

FIG. 3 is a connection diagram illustrating a state where the inner and outer stator windings 7b and 8b are connected to an inverter 11. For example, as shown in FIG. 3, the U-, V- and W-phase inner stator windings 7b are serially connected to the X-, Y- and Z-phase outer stator windings 8b, respectively, to establish a star connection which is connected to the inverter 11. The inverter 11 is controlled by an ECU (electronic control unit), not shown. The control performed by the ECU is based on information derived from a rotor position sensor, not shown, which senses the rotational position of the rotor 6. The inverter 11 converts the electric power of a direct-current power source B into alternating-current electric power and supplies the converted electric power to the inner and outer stator windings 7b and 8b.

When the inner and outer stator windings 7b and 8b are excited via the inverter 11, the inner and outer stators 7 and 8 each generate winding magnetomotive force in such a way that the same polarity is created in the magnetic poles that are radially opposed to each other via the rotor 6 at the same circumferential position.

Hereinafter is described a design specification related to the magnetic circuits of the rotor 6.

First, portions of the magnetic circuits shown in FIG. 2 are defined as follows.

The circumferential width of each outer salient pole 6B is referred to as outer-salient-pole width and denoted as P6.

The circumferential width of each inner salient pole 6A is referred to as inner-salient-pole width and denoted as P7.

The circumferential width of each outer magnet 10 is referred to as outer-magnet width and denoted as P13. Although the outer magnet 10 shown in FIG. 2 is divided into two in the circumferential direction by the bridge 6d, P13 indicates a circumferential width, including the bridge 6d, of one outer magnet 10 that corresponds to one magnetic pole.

The following Formula (1) is applied to the relationship between P6 and P13, while Formula (2) is applied to the relationship between P6 and P7.

$$3.5 < P13/P6 \qquad (1)$$

$$P7/P6 > 0.5 \qquad (2)$$

(Advantageous Effects of the First Embodiment)

The motor 1 of the first embodiment uses the magnet-embedded rotor 6 in which the inner magnets 9 are embedded in the rotor core 6a so as to be located radially inward thereof and the outer magnets 10 are embedded in the rotor core 6a so as to be located radially outward thereof. Therefore, both of the magnet torque and the reluctance torque are put to practical use.

Further, full-pitch winding of the inner stator windings 7b and the outer stator windings 8b are applied to the inner stator 7 and the outer stator 8, respectively. Specifically, the pole pitch of the rotor 6 is equal to the pole pitch of the magnetic field generated by the inner and outer stator windings 7b and 8b. Therefore, the reluctance torque can be fully used.

Further, in the inner salient poles 6A and the outer salient poles 6B formed in the rotor core 6a, the inner peripheral surface of each inner salient pole 6A is ensured to be concyclic with the inner-radius surface of the rotor 6, and the outer peripheral surface of each outer salient pole 6B is ensured to be concyclic with the outer-radius surface of the rotor 6. In other words, since the inner peripheral surface of each inner salient pole 6A and the outer peripheral surface of each outer salient pole 6B are not concaved, magnetic resistance will not be increased as in the double-stator motor disclosed in the patent document JP-A-2008-302789. Accordingly, the reluctance torque can be effectively used.

With the application of Formulas (1) and (2) set forth above to the magnetic circuits of the rotor 6, an appropriate relationship can be established between P13 (outer-magnet width), P6 (outer-salient-pole width) and P7 (inner-salient-pole width). Thus, the rate of the magnet torque can be increased in the outer magnetic circuit. Also, since the magnetic saturation is minimized in the rotor yoke 6z, the reluctance torque can be fully used in the inner magnetic circuit as well.

The outer magnetic circuit refers to a magnetic circuit in which magnetic flux passes between the outer stator 8 and the rotor 6. The inner magnetic circuit refers to a magnetic circuit in which magnetic flux passes between the inner stator 7 and the rotor 6. The rotor yoke 6z refers to a portion of the rotor core 6a, in which the magnetic path is shared between the outer and inner magnetic circuits.

Figure 4:
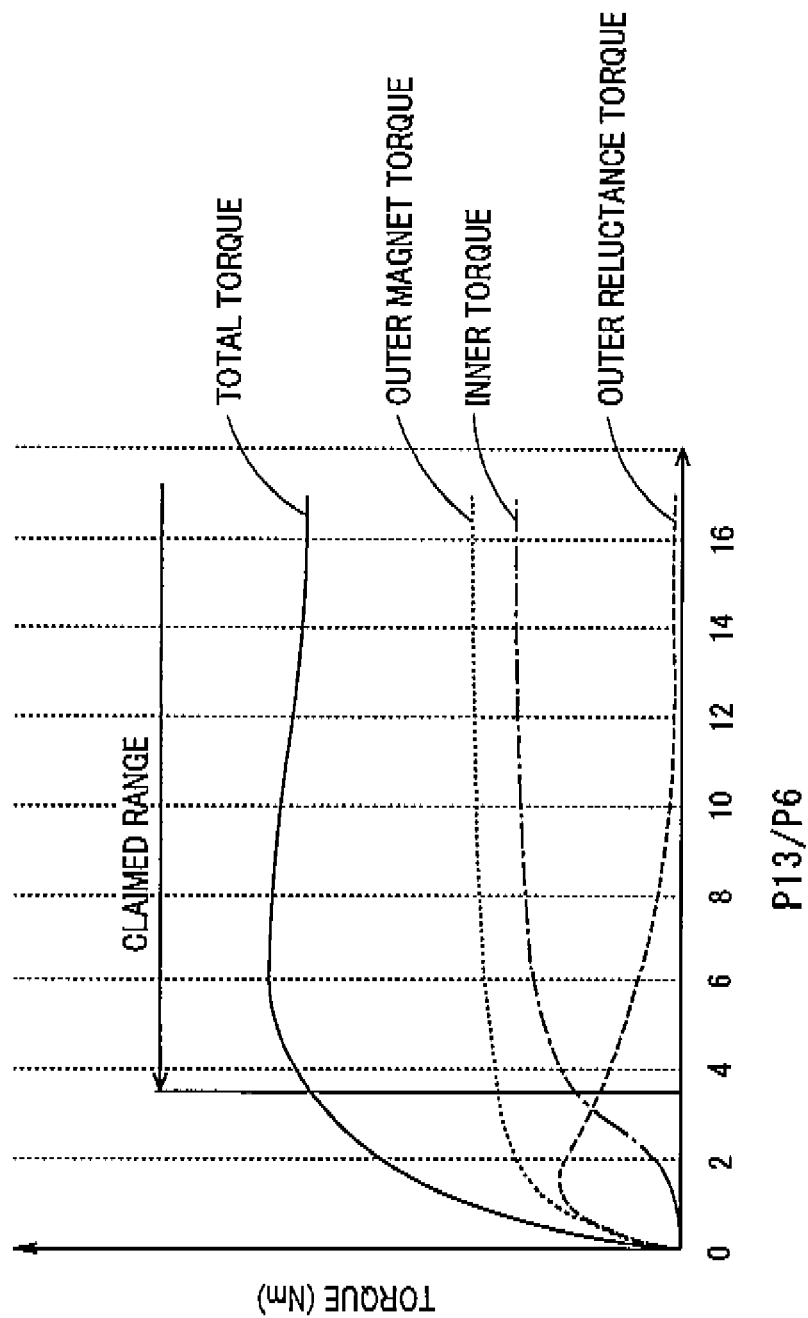
FIG. 4 shows the range of P13/P6 relative to torque, resulting from simulations.

The requirements of Formulas (1) and (2) set forth above are derived as a result of simulations using models on a computer. The results of the simulations are shown in FIGS. 4 and 5.

The models of the simulations meet the requirements of both of Formulas (1) and (2). Specifically, with the requirements of Formula (2) being met, when an output torque is calculated using P13/P6as a parameter, total output torque is enhanced, as shown in FIG. 4, in the range of Formula (1) (claimed range shown in FIG. 4). More specifically, the magnet torque in the outer magnetic circuit becomes high, and the inner torque also becomes high in the inner magnetic circuit, the inner torque being the sum of the magnet torque and the reluctance torque.

Figure 5:
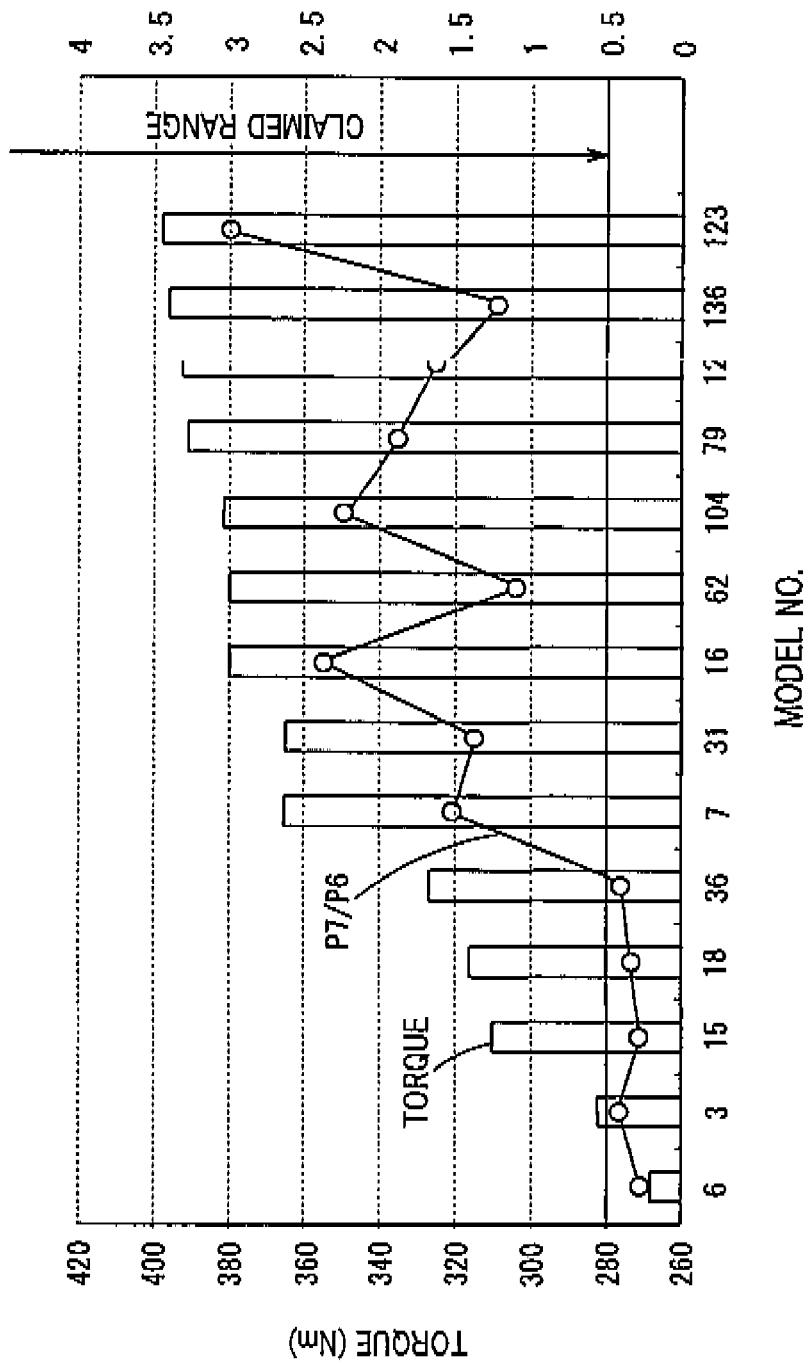
FIG. 5 shows the range of P7/P6 relative to torque, resulting from simulations.

Similarly, with the requirements of Formula (1) being met, when an output torque is calculated using P7/P6as a parameter, total output torque is enhanced, as can be seen from FIG. 5, in the range of P7/P6>0.5 that meets the requirements of Formula (2).

The simulations reveal that, when the requirements of Formulas (1) and (2) are met, the output torque of the motor as a whole is enhanced and therefore a small-size and high-power motor can be realized.

(Other Embodiments)

Referring to FIGS. 6 to 13, hereinafter are described second to fourth embodiments related to the present invention.

In the second to fourth embodiments, the components identical with or similar to those in the first embodiment are given the same reference numerals for the sake of omitting unnecessary explanation.

(Second Embodiment)

Figure 6:
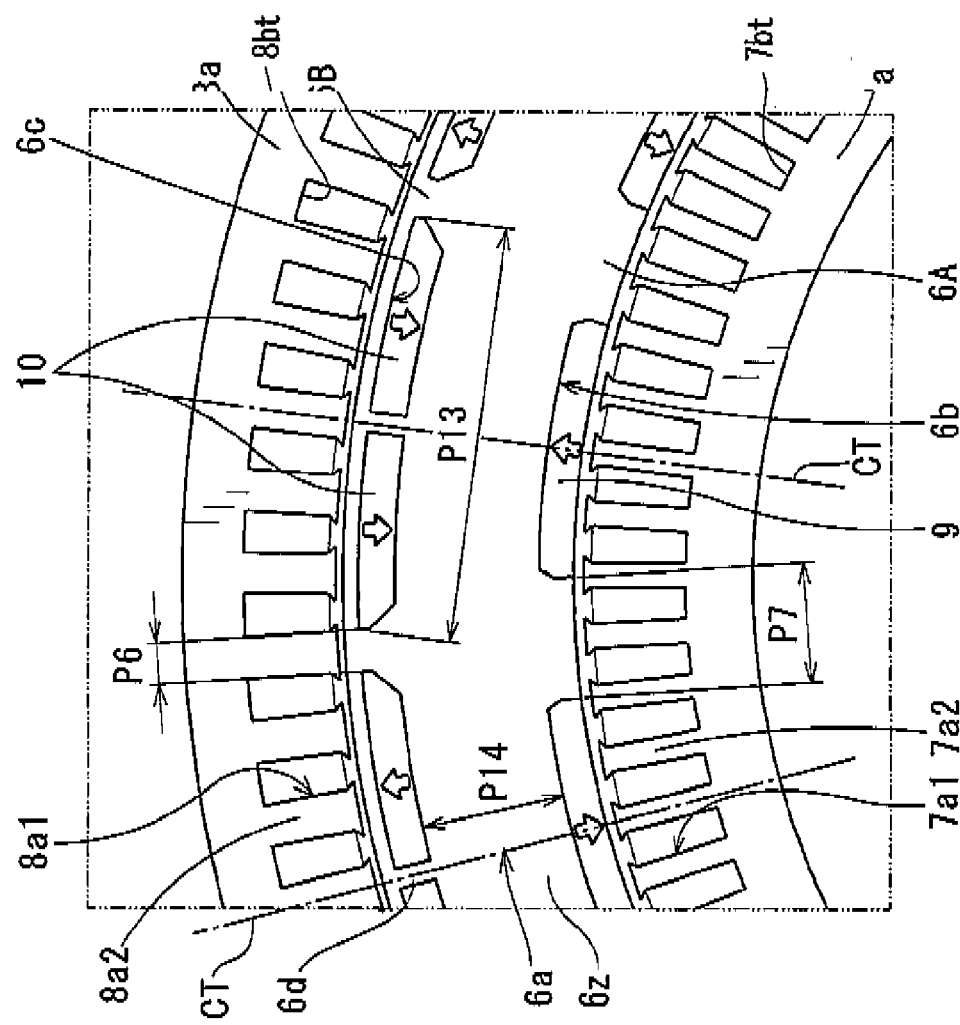
FIG. 6 is a cross-sectional view illustrating the magnetic circuits of a motor, according to a second embodiment of the present invention.

In the second embodiment, a range of the width of the rotor yoke 6z in the radial direction (radial width of the rotor yoke) is set, in addition to the requirements of Formulas (1) and (2) of the first embodiment. FIG. 6 is a cross-sectional view illustrating the magnetic circuits of the motor 1 according to the second embodiment. As shown in FIG. 6, the radial width of the rotor yoke 6z is designated as P14, the radial width being taken along a line connecting between the centers CT of the magnetic poles of an inner magnet 9 and the opposed outer magnet 10. In this case, a relationship expressed by the following Formula (3) is established.

$$P14/(P6+P7)>0.8 \quad (3)$$

Figure 7:
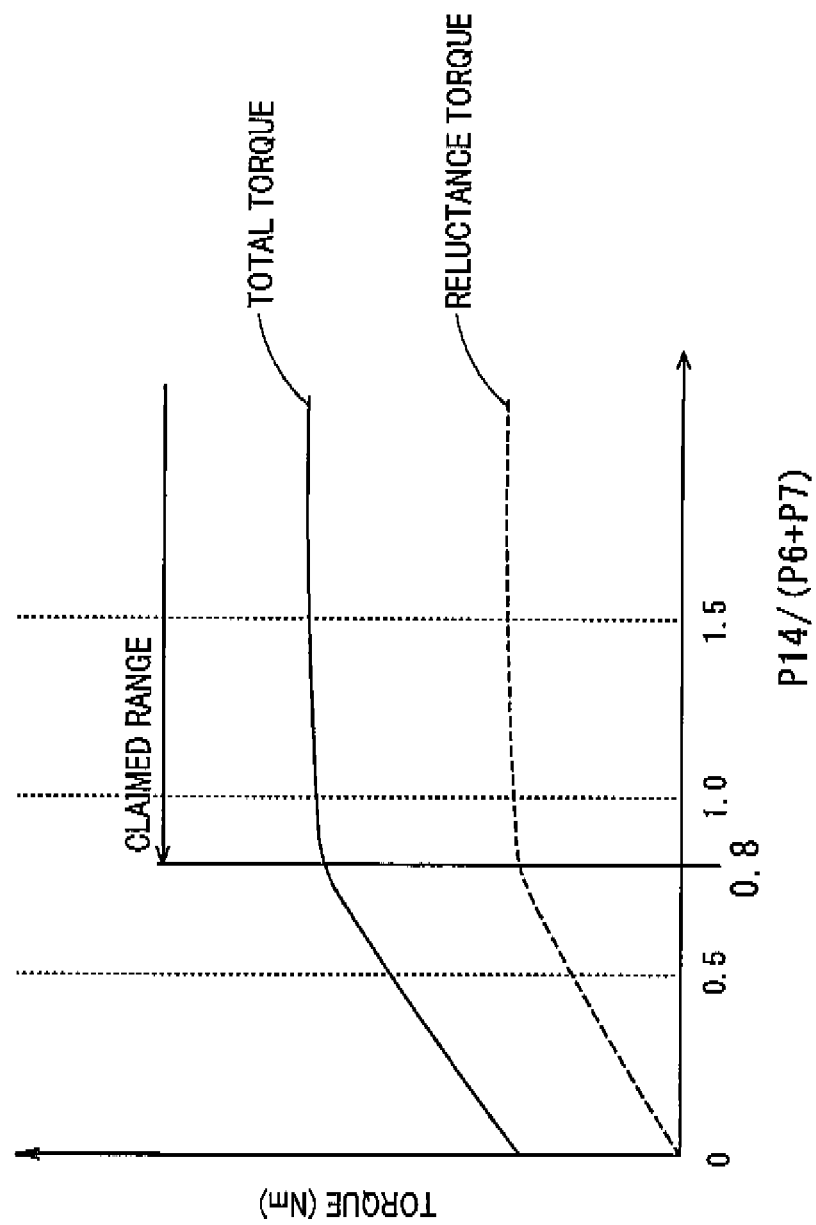
FIG. 7 shows the range of P14/(P6+P7) relative to torque, resulting from simulations.

When the relationship expressed by Formula (3) is established, magnetic flux that generates the reluctance torque, i.e. the amount of magnetic flux passing through the rotor yoke 6z, is maximized and the output torque is enhanced. FIG. 7 shows output torque calculated as a result of simulations, using P14/(P6+P7) as a parameter. As is also apparent from FIG. 7, the output torque is enhanced in the range of establishing Formula (3) (claimed range shown in FIG. 7).

(Third Embodiment)

In the third embodiment, dimensional ranges at portions related to the magnetic circuits of the motor 1 are set, on condition that the requirements of Formulas (1) and (2) of the first embodiment and Formula (3) of the second embodiment are met.

Figure 8:
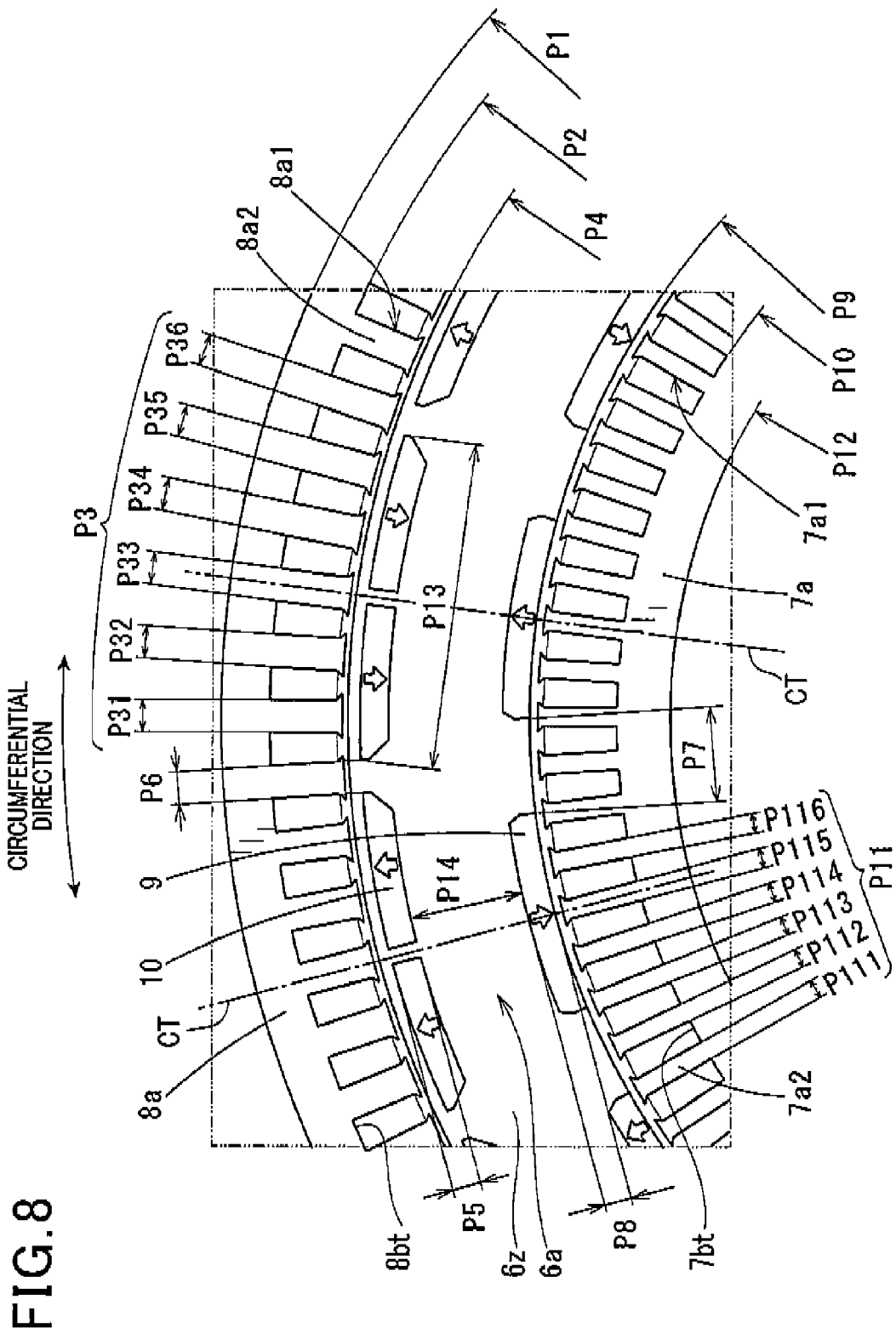
FIG. 8 is a cross-sectional view illustrating the magnetic circuits of a motor, according to a third embodiment of the present invention.

FIG. 8 is a cross-sectional view illustrating the magnetic circuits of the motor 1 according to the third embodiment. Portions in the magnetic circuits shown in FIG. 8 are denoted as P1 to P13 as follows. It should be appreciated that P6(outer-salient-pole width), P7 (inner-salient-pole width) and P13 (outer-magnet width) are the same as those of the first embodiment.

The outer diameter of the outer stator 8 is referred to as outer-stator outer diameter and denoted as P1.

The diameter of each outer slot 8a1 is referred to as an outer-stator inter-slot diameter and denoted as P2. That is, this diameter P2 is a radial distance between the bottoms of two of the outer slots 8a1, which diameter passes through the central axis CL, that is, the center O, of the shaft 4, as shown in FIG. 8.

The number of the outer teeth 8a2 included in one pole of the stator 8 (six in FIG. 8) multiplied by the width of one outer tooth 8a2 (P31, P32, 33, P34, P35 or P36 in FIG. 8) is referred to as outer-stator-tooth width and denoted as P3.

The outer diameter of the rotor 6 is referred to as rotor outer diameter and denoted as P4.

The radial thickness of each outer magnet 10 is referred to as outer-magnet thickness and denoted as P5.

The radial thickness of each inner magnet 9 is referred to as inner-magnet thickness and denoted as P8.

The inner diameter of the rotor 6 is referred to as rotor inner diameter and denoted as P9.

The diameter of each inner slot 7a1 is referred to as an inner-stator inter-slot diameter and denoted as P10. That is, this diameter P10 is a radial distance between the bottoms of two of the inner slots 7a1, which diameter passes through the radial center of the inner stator 7 (in other words, the radial center of the outer stator 8), as shown in FIG. 8. The inner and outer stators 7 and 8 are arranged concentrically.

The inner diameter of each inner slot 7a1 is referred to as inner-slot inner diameter and denoted as P10. That is, this diameter P10 is a radial distance passing through the radial center of the inner stator 7 (in other words, the radial center of the outer stator 8) to the bottom 7bt of each inner slot 7a1, as shown in FIG. 8. The inner and outer stators 7 and 8 are arranged concentrically.

The number of the inner teeth 7a2 included in one pole of the inner stator 7 (six in FIG. 8) multiplied by the width of one inner tooth 7a2 (P111, P112, P113, P114, P115 or P116 in FIG. 8) is referred to as inner-stator-tooth width and denoted as P11.

The inner diameter of the inner stator 7 is referred to as inner-stator inner diameter and denoted as P12.

Figure 9:
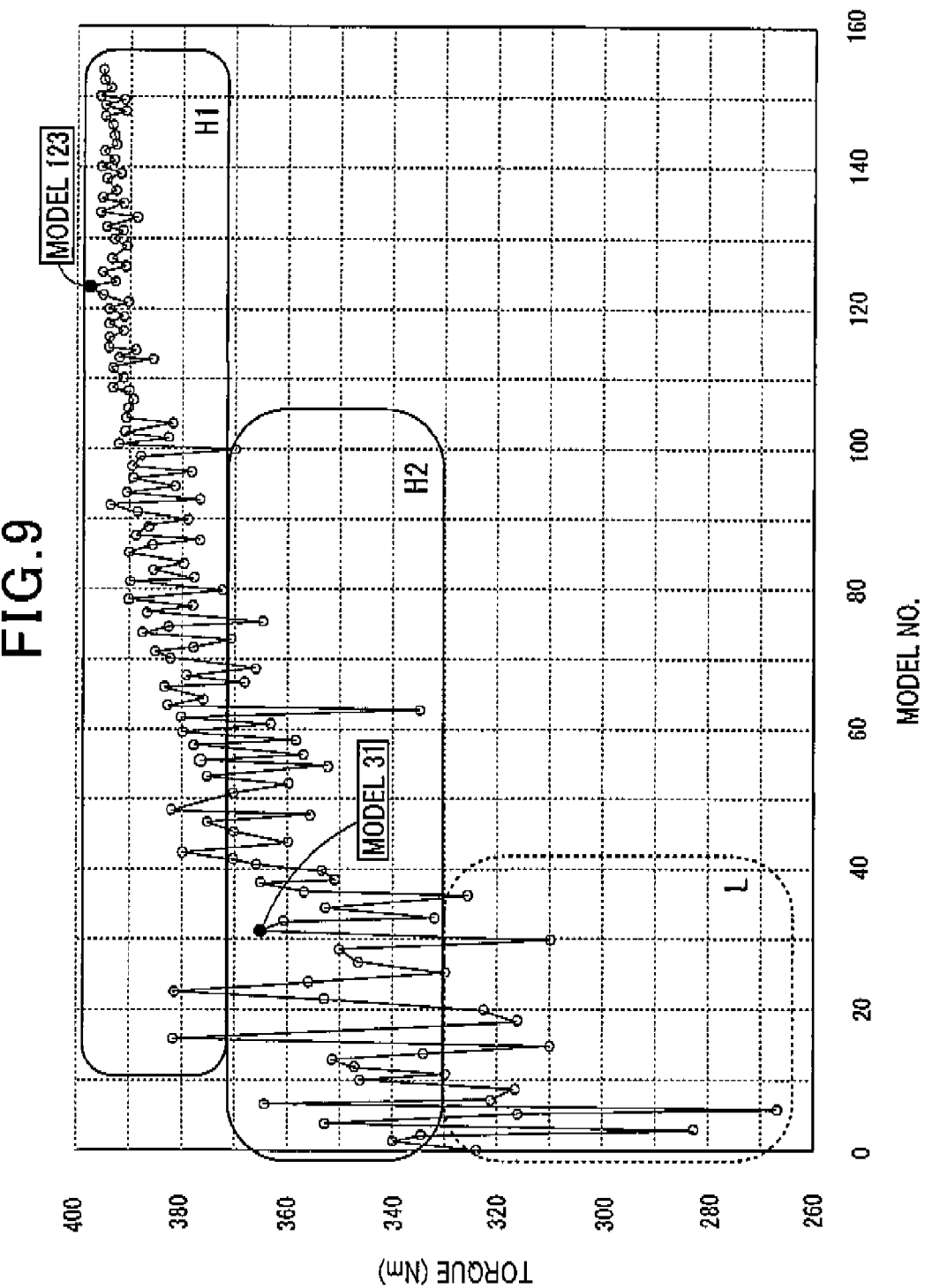
FIG. 9 is a graph showing the results of calculations of torque generated by models, according to the third embodiment.

On the premise that the requirements of Formulas (1) and (2) of the first embodiment are met and that the relationship expressed by Formula (3) of the second embodiment is established, output torque was calculated, with parameters of P1 to P13 being given to the simulation models. FIG. 9 shows output torque resulting from the calculation performed for each of the models.

Based on the results of the simulations, the models were classified into three groups, i.e. Group H1 of generating high torque, Group H2 of generating middle torque and Group L of generating low torque.

FIG. 10 is a table listing design specifications of Groups H1, H2 and L. FIG. 10 corresponds to the following Table 1:

TABLE 1

| Torque characteristics | Superior | |
|---|---|---|
| | Group H1 | Group H2 |
| P1: Outer-stator outer diameter | 1 | |
| P2: Outer-stator inter-slot diameter | 0.936-0.966 | 0.928-0.974 |
| P3: Outer-stator-tooth width (per pole) | 0.0632-0.1016 | 0.0564-0.1128 |
| P4: Rotor outer diameter | 0.846-0.884 | 0.835-0.895 |
| P5: Outer-magnet thickness | 0.0112-0.0207 | 0.0112-0.0226 |
| P6: Outer-salient-pole width | 0.0112-0.0339 | 0.0075-0.0376 |
| P7: Inner-salient-pole width | 0.0150-0.0489 | 0.0132-0.0489 |
| P8: Inner-magnet thickness | 0.0093-0.0207 | 0.0056-0.0207 |
| P9: Rotor inner diameter | 0.688-0.726 | 0.680-0.726 |
| P10: Inner-stator inter-slot diameter | 0.579-0.636 | 0.575-0.636 |
| P11: Inner-stator-tooth width (per pole) | 0.0316-0.0734 | 0.0278-0.0734 |
| P12: Inner-stator inner diameter | 0.541-0.587 | 0.526-0.594 |
| P13: Outer-magnet width (per pole) | 0.1053-0.1579 | 0.1015-0.1617 |

In FIG. 10, using P1=266 mm as a reference, the dimensional ranges of P2 to P13 are shown, being divided into Groups H1, H2 and L. In conformity with the rate of increase/decrease of the dimension of P1, the dimensional ranges of P2 to P13 relatively vary. For example, when the dimension of P1 is increased/decreased by 10%, the dimensional ranges of P2 to P13 also increase/decrease by 10%. FIG. 10 schematically shows, in the right column, the dimensional ranges of P2 to P13, being distinguishable between Groups H1, H2 and L.

The motor 1 of the third embodiment is based on a design specification having the dimensions (dimensions of P1 to P13) of the magnetic circuits included in the ranges of Group H2 shown in FIG. 10. More desirably, the motor 1 may be based on a design specification included in the ranges of Group H1 shown in FIG. 10. The design specification included in Group L is disapproved.

FIG. 11 is a table listing the design specification of Model 31 shown in FIG. 9, as an example of a model having dimensions of the magnetic circuits included in the ranges of Group H2. Similarly, FIG. 12 is a table listing the design specification of Model 123 shown in FIG. 9, as an example of a model having dimensions of the magnetic circuits included in the ranges of Group H1.

As described above, when the motor 1 is based on a design specification having dimensions of the magnetic circuits (dimensions of P1 to P13) included in the ranges of Group H2 of FIG. 10, the output torque of the motor is enhanced compared to the model based on a design specification included in the ranges of Group L. More preferably, it is desirable that the motor 1 is based on a design specification included in the ranges of Group H1. In this case, as shown in FIG. 9, the output torque is more increased and accordingly the motor 1 will be reduced in its size and enhanced in its power.

(Fourth Embodiment)

Figure 13:
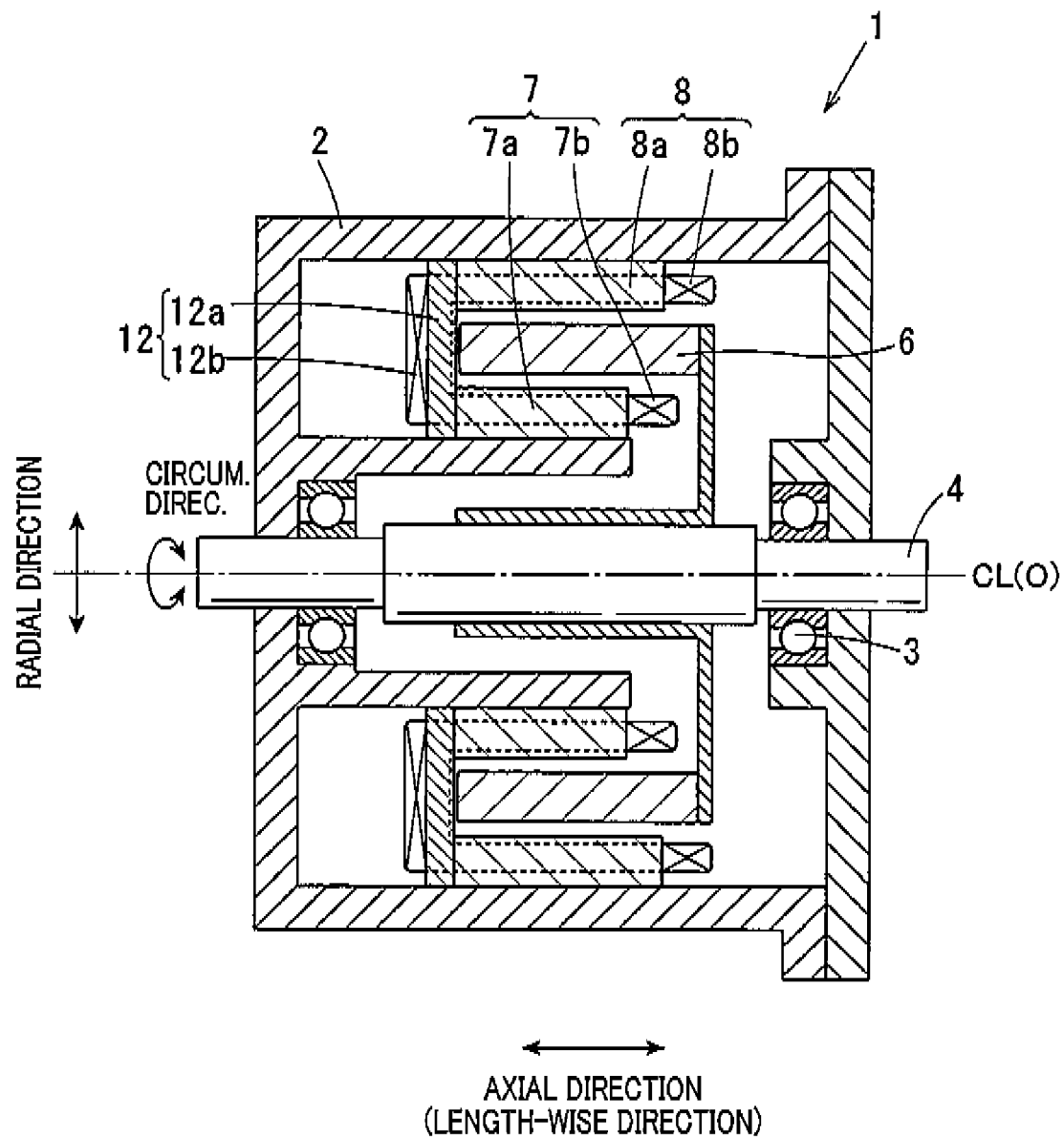
FIG. 13 is a vertical cross-sectional view illustrating a configuration of a motor, according to a fourth embodiment of the present invention.

The fourth embodiment deals with an example of a triple-gap type motor 1. FIG. 13 is a vertical cross-sectional view illustrating a triple-gap type motor 1 of the fourth embodiment. As shown in FIG. 13, the triple-gap type motor 1 includes a side stator 12 that faces an end face of the rotor 6, which is axially opposite to the rotor disc (on the left in FIG. 13), with a gap therebetween. The side stator 12 includes a side stator core 12a and a side stator winding 12b. The side stator core 12a is connected to the inner and outer stator cores 7a and 8a. A full-pitch winding of the side stator winding 12b is applied to the side stator core 12a. The side stator winding 12b serially connects between the inner and outer stator windings 7b and 8b.

The triple-gap type motor 1 forms magnetic gaps in three faces between the rotor 6 and the stators 7, 8 and 12. Accordingly, when the requirements of Formulas (1) and (2) of the first embodiment and Formula (3) of the second embodiment are applied to the magnetic circuits of the rotor 6 of the triple-gap type motor 1, torque can be further enhanced. In addition, when the design specifications described in the third embodiment are applied to the triple-gap type motor 1, the output torque will be enhanced, the size will be reduced, and the power will be increased.

The present invention may be embodied in several other forms without departing from the spirit thereof. The embodiment and modifications described so far are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. A multi-gap type rotary electric machine, comprising:
   a shaft supported rotatably by a bearing secured to a housing;
   an annular rotor secured to the shaft and configured 5 to rotate together with the shaft; and
   a stator secured to the housing and configured to have a gap between the stator and the rotor,
   wherein
   the rotor comprises
   an annular rotor core made of soft magnetic material and configured to have a radial direction and a circumferential direction,
   a plurality of inner magnets, each composed of a permanent magnet, embedded in radially inner portions of the rotor core at equal pitches in the circumferential direction, and
   a plurality of outer magnets, each composed of a permanent magnet, embedded in radially outer portions of the rotor core at equal pitches in the circumferential direction;
   the rotor core comprises
   a plurality of inner salient poles each formed between mutually adjacent two of the inner magnets in the circumferential direction, and
   a plurality of outer salient poles each formed between mutually adjacent two of the outer magnets in the circumferential direction, the inner and outer salient poles being made of soft magnetic material;
   the stator comprises at least
   an inner stator located on a radially inner side of the rotor with a gap left between the inner stator and the rotor, and
   an outer stator located on a radially outer side of the rotor with a gap left between the outer stator and the rotor,
   wherein the inner stator comprises
   an inner stator core provided with a plurality of inner slots formed on an radially outer circumference of the inner stator at equal intervals in the circumference direction and a plurality of inner teeth formed on the radially outer circumference at equal intervals in the circumferential direction, the inner slots and the 5 inner teeth being aligned alternately in the circumferential direction; and an inner stator winding full-pitch wound at the inner stator core through the inner slots, the outer stator comprises an outer stator core provided with a plurality of outer slots formed on an radially inner circumference of the outer stator at equal intervals in the circumference direction and a plurality of outer teeth formed on the radially inner circumference at equal intervals in the circumferential direction, the outer slots and the outer teeth being aligned alternately in the circumferential direction; and an outer stator winding full-pitch wound at the outer stator core through the outer slots, wherein relationships of:

$$3.5 < P13/P6 \qquad (1)$$

and $$P7/P6 > 0.5 \qquad (2)$$

are met, where P6 denotes a circumferential width of each of the outer salient poles, P7 denotes a circumferential width of each of the inner salient poles, and P13 denotes a circumferential width of each of the outer magnets.

2. The rotary electric machine of claim 1, wherein the rotor core includes a rotor yoke which provides a magnetic path in common for both an outer magnetic circuit and an inner magnetic circuit through which magnetic fluxes from the outer stator and the inner stator pass, and a relationship of $$P14/(P6+P7) > 0.8 \qquad (3)$$

is met, where P14 denotes a radial width of the rotor yoke at a pole center between each of the inner magnets and each of the outer magnets.

3. The rotary electric machine of claim 2, wherein when the outer stator has an outer diameter of P1, a diameter between bottoms of two of the outer slots, which passes through a radial center of the outer stator, is P2, P3 denotes a circumferential length obtained by multiplying a circumferential width of one of the outer teeth by the number of outer teeth contained in one magnetic pole of the outer stator, the rotor has an outer diameter of P4, each of the outer magnets has a radial thickness of P5, each of the inner magnets has a radial thickness of P8, the rotor has an inner diameter of P9, a diameter between bottoms of two of the inner slots, which passes through the radial center of the outer stator, is P10, P11 denotes a circumferential length obtained by multiplying a circumferential width of one of the inner teeth by the number of inner teeth contained in one magnetic pole of the inner stator, and the inner stator has an inner diameter of P12, the dimensions P1 to P13 except for the dimensions P6, P7, and P13 are set to meet dimensional ratios listed in a group H2 of the following table 1, the dimensions P6 and P13 are set to meet both the dimensional ratios listed in the group H2 of the table 1 and the relationships of $3.5 < P13/P6$, and the dimensions of P6 and P7 are set to meet both the dimensional ratios listed in the group H2 of the table 1 and the relationships of $P7/P6 < 0.5$:

TABLE 1

| Torque characteristics | Superior | |
|---|---|---|
| | Group H1 | Group H2 |
| P1: Outer-stator outer diameter | 1 | |
| P2: Outer-stator inter-slot diameter | 0.936-0.966 | 0.928-0.974 |
| P3: Outer-stator-tooth width (per pole) | 0.0632-0.1016 | 0.0564-0.1128 |
| P4: Rotor outer diameter | 0.846-0.884 | 0.835-0.895 |
| P5: Outer-magnet thickness | 0.0112-0.0207 | 0.0112-0.0226 |
| P6: Outer-salient-pole width | 0.0112-0.0339 | 0.0075-0.0376 |
| P7: Inner-salient-pole width | 0.0150-0.0489 | 0.0132-0.0489 |
| P8: Inner-magnet thickness | 0.0093-0.0207 | 0.0056-0.0207 |
| P9: Rotor inner diameter | 0.688-0.726 | 0.680-0.726 |
| P10: Inner-stator inter-slot diameter | 0.579-0.636 | 0.575-0.636 |
| P11: Inner-stator-tooth width (per pole) | 0.0316-0.0734 | 0.0278-0.0734 |
| P12: Inner-stator inner diameter | 0.541-0.587 | 0.526-0.594 |
| P13: Outer-magnet width (per pole). | 0.1053-0.1579 | 0.1015-0.1617 |

4. The rotary electric machine of claim 3, wherein the dimensions P1 to P13 are set to meet dimensional ratios listed in a group H1 of the table 1.

* * * * *